April 27, 1937.  F. W. MERRILL  2,078,805
PERMANENT MAGNET DYNAMO-ELECTRIC MACHINE
Filed Feb. 7, 1935  2 Sheets-Sheet 1
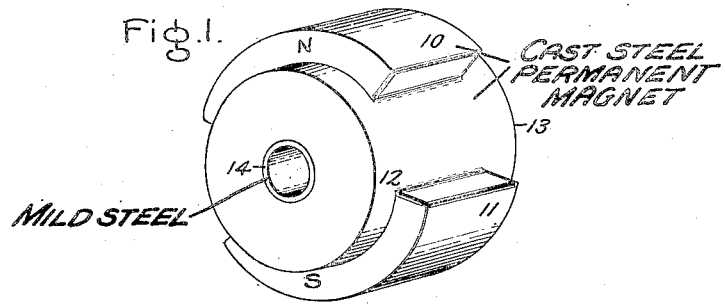
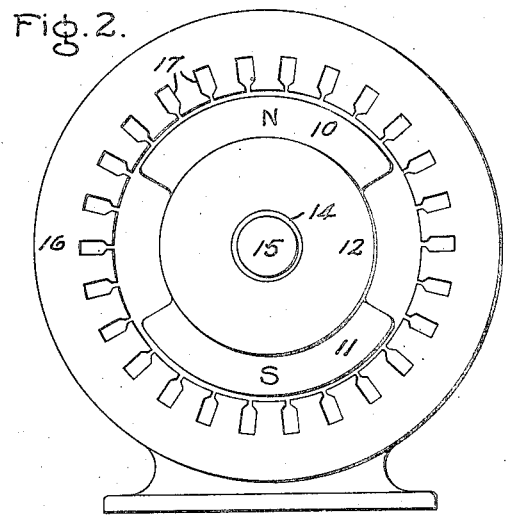
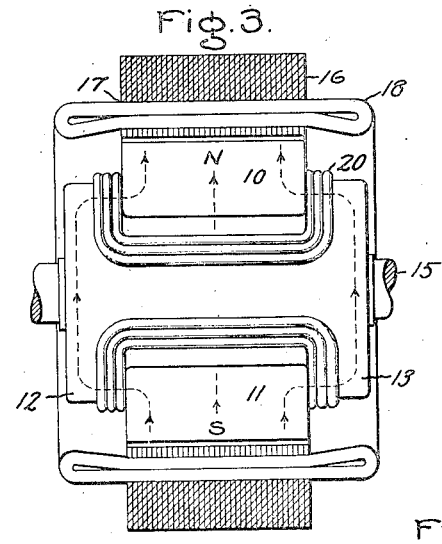
Inventor:
Frank W. Merrill,
by Harry E. Dunham
His Attorney.

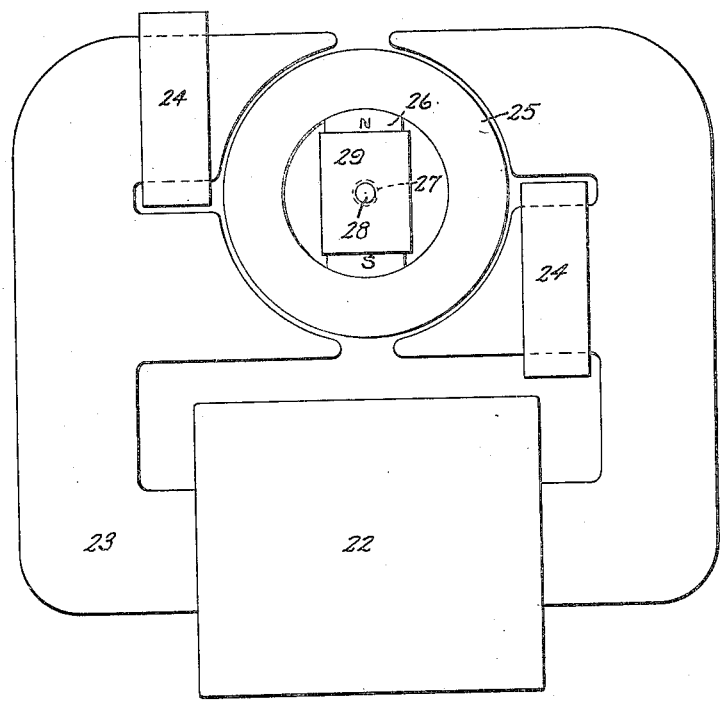

Patented Apr. 27, 1937

2,078,805

UNITED STATES PATENT OFFICE 2,078,805

PERMANENT MAGNET DYNAMO-ELECTRIC MACHINE

Frank W. Merrill, Fort Wayne, Ind., assignor to General Electric Company, a corporation of New York Application February 7, 1935, Serial No. 5,420

7 Claims. (Cl. 171—209)

My invention relates to improvements in dynamo-electric machines having permanent magnet excitation and is intended primarily for small machines such as magnetos and small motors. The invention relates primarily to the structure of the permanent magnet and its protection against demagnetization while in use.

Permanent magnets have heretofore been used in small dynamo-electric machines. Such magnets have usually been of the horseshoe shape to obtain the length and shielding against demagnetization necessary for satisfactory results and, because of the size and shape thereof, such magnets have usually been placed on the stator of the machine. With recent improvements in permanent magnetic materials, it is now possible to make short bar-shaped permanent magnets which will retain their magnetism indefinitely. When such a magnet is used in a dynamo-electric machine, it is advisable to protect it from the demagnetizing effects generally present in such machines and one feature of my invention is to provide a novel shielding arrangement for this purpose.

An undesirable feature of one of the newer and otherwise very satisfactory permanent magnet materials is its extreme brittleness and hardness, such that it is impracticable to attempt machining operations thereon other than grinding after the material has been cast. Another aspect of my invention relates to a cast permanent magnet rotor for dynamo-electric machines having facilities for fitting it to its shaft without destructive and difficult machining operations on the permanent magnetic material, itself. These and other improvements to be explained make it possible to employ permanent magnet rotors for dynamo-electric machines much more generally than has heretofore been possible and also to improve the machine mechanically and electrically.

The features of my invention which are believed to be novel and patentable will be pointed out in the claims appended hereto. For a better understanding of my invention, reference is made in the following description to the accompanying drawings wherein Fig. 1 shows a perspective view of a cast permanent magnet rotor intended for a magneto generator; Fig. 2 shows an end view of the rotor in position in the stator core structure of such a machine; Fig. 3 shows a side view of the rotor together with a sectional side view of the stator to illustrate that the shape of rotor used does not extend the overall length of the machine; Fig. 3 also shows a flux-shielding winding on the rotor to aid in preventing demagnetization thereof; Fig. 4 shows an end view of a permanent magnet rotor with a slightly different disposition of the shielding winding thereon; and Fig. 5 shows a modified form of permanent magnet rotor embodying certain features of my invention for use in a self-starting synchronous motor, the stator of which is also shown.

Referring first to Fig. 1, I have here represented a two-pole permanent magnet suitable for use as the rotor of a small generator or magneto. The material used in the permanent magnet may be formed of an iron-nickel-aluminum alloy as described in United States Patent No. 1,947,274, February 13, 1934, Ruder, or I may use the iron-nickel-aluminum-cobalt alloy permanent magnet such as is described in United States Patent No. 1,968,569, July 31, 1934, Ruder. With these materials, it is possible to make satisfactory bar-shaped permanent magnets of very short length. Thus the diameter of the rotor of Fig. 1, corresponding to the length of the permanent magnet, may be of the order of three inches, for example. The material is cast in one piece having the pole pieces 10 and 11 and large hub-like extensions 12 and 13 at either end. The material in question is very hard and is also brittle, especially the alloy without the cobalt content and it is, therefore, difficult to machine so that the magnet is cast as near as possible to the exact shape and size desired.

The rotor must be fitted and secured to a suitable shaft and, in order to facilitate this, I employ an axial tube 14 of some softer and less brittle material about which the magnet is cast-welded during the casting operation. The tube 14 may be of mild steel so that the bore of the finished casting may be reamed out or otherwise brought to size to make a tight fit with the shaft 15 (Fig. 2). The shaft may then be pressed into the bore and the steel tube takes the strain of this operation without placing undue stress on the brittle permanent magnet material. The finished rotor may then be trued up by grinding if necessary but no other machining operations will be required.

The rotor is permanently magnetized in the usual way to form north and south poles at the opposite pole pieces 10 and 11 as indicated by the designations "N" and "S".

The shape of and the disposition of the permanent magnet material in the rotor are such that the pole pieces afford a greater cross-sectional area in the path of the permanent magnet flux than that of the central portion of the magnet exclusive of the axial extensions 12 and 13; that is, if the extensions 12 and 13 were cut off even with the end surfaces of the pole pieces, the permanent magnet would have its smallest cross section through its middle portion. This reduced central cross section is due largely to the space occupied by the shaft and hollow tube 14, which are not of permanent magnet material and hence do not serve as a storage space for permanent magnet flux. The axial extensions 12 and 13 of the rotor are thus provided as a part of the permanent magnet to accommodate a portion of the flux that would otherwise saturate the material opposite the intersalient spaces when being magnetized and prevent the magnetizing flux from reaching a high density throughout the entire magnet. This spreading of the flux into the axial extensions is indicated by dotted line arrows in Fig. 3. Thus, the entire casting becomes a strong permanent magnet with substantially uniform high-flux density at all points throughout its magnetic axis. The permanent flux carrying capacity of the magnet between the pole pieces and consequently that of the magnet as a whole is increased.

The extension of the rotor to provide the flux capacity in the central portion does not add to the overall length of the machine as it will be evident that the stator winding end connections 18 will surround the extensions 12 and 13 and otherwise determine the axial length of the machine as represented in Fig. 3.

The stator core structure to be used with this form of permanent magnet rotor will preferably be without salient poles so as to form a keeper for the permanent magnet in all rotary positions of the rotor as indicated in Fig. 2 where the stator without its windings is indicated at 16. Any usual suitable form of two-pole winding 18 will be provided in the slots 17 of the stator (see Fig. 3).

The structure thus far described is that intended for a magneto generator. It, of course, could also be used as a non-self starting synchronous motor. The structure is rugged and compact with an efficient utilization of the magnetic material and has the important advantage that no electrical connections, such as slip rings, are necessary between the rotor and an outside source of excitation. In dynamo-electric machines generally, there occur conditions, that may be due to armature reaction, sudden changes in load or in starting, where the sudden flux changes or distorted flux distribution may tend to eventually demagnetize the permanent magnet rotor of a machine such as described. To minimize this tendency, I prefer to provide a flux-damping coil or winding about the permanent magnet. This is shown at 20 and 21 in Figs. 3, and 4. In Fig. 3, the end turns of this winding are carried around the periphery of the axial extensions of the rotor core. In Fig. 4, the end turns are carried about the ends of the rotor. In either case, the flux of the permanent magnet threads this coil or winding which is short-circuited on itself so that any change in the flux of the permanent magnet will set up an opposing current in this damping coil. Sudden or material changes in flux through the permanent magnet, such as might ordinarily occur and cause demagnetization, are thus minimized.

In Fig. 5 I have represented a self-starting synchronous motor having a permanent magnet rotor embodying my invention. The stator field structure is of the usual bipolar shaded-pole single-phase type, having a single-phase energizing winding 22, a U-shaped core structure 23 with shading coils 24 on portions of its split pole pieces to produce a single-phase flux having a shifting or rotating component through the rotor. The rotor consists of an outer cylindrical portion 25 preferably made of a number of washer-shaped steel laminations. This portion of the rotor is like that used in hysteresis motors and may be used alone without the permanent magnet spider portion 26 represented. Such a motor is described in United States Patent No. 1,884,140, October 25, 1932, Nickle. However, the permanent magnet insert or spider portion improves the synchronous motor torque and the power factor of the motor and decreases the external excitation necessary during normal operation. It likewise serves as the spider of the rotor structure.

The permanent magnet 26 is made by cast-welding the permanent magnet alloy previously referred to about a steel tube indicated in dotted lines at 27. The steel tube is then reamed out to make a tight fit with the shaft 28. A thin shell of conducting material 29 of proper resistance constituting the damper winding and containing central openings to fit the shaft is then slipped snugly over the magnet and the shaft pressed through the assembled permanent magnet structure with its damper winding. The magnet is then pressed into the cylindrical laminated steel portion 25. There will be sufficient spring in this hollow steel portion to permit this without destructive effects on the brittle permanent magnet. The outer cylindrical portion acts as a keeper for the permanent magnet which polarizes the shell portion and improves the torque and efficiency of the motor at synchronous speed. The damper winding 29 forces the stator flux passing between the pole pieces to pass through the peripheral portion 25 of the rotor and prevents demagnetization of the permanent magnet during starting operations when the rotor is non-synchronous with the field.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. A permanent magnetic rotor for dynamo-electric machines having a salient pole permanent magnet symmetrically cast-welded about a tube of machinable metal substantially concentric with the axis of rotation of such rotor.

2. A permanent magnet for the rotor of a dynamo-electric machine comprising a casting of permanent magnet material having salient pole portions and intermediate core portions, the salient pole portions being of greater cross-sectional area than the directly intermediate connecting core portion, said intermediate core portion having integral permanently magnetized axial extensions to increase its permanent flux-carrying capacity between the salient pole pieces.

3. A permanent magnet for the rotor of a dynamo-electric machine comprising a casting of permanent magnet material having enlarged salient pole portions such that the magnet has a reduced center cross-section in a plane at right angles to its axis of rotation and having integral permanently magnetized axial extensions from the central portion such that the cross-sectional area of the permanent magnet and its flux-carrying capacity is substantially uniform throughout its magnetic axis.

4. A salient pole permanent magnet rotor for dynamo-electric machines comprising a casting of permanent magnet material having a reduced center cross-section in a plane at right angles to its axis of rotation and being of greater length adjacent the axis of rotation than at the salient pole portions so as to have substantially the same cross-sectional area at all points of its magnetic axis, said material being cast-welded about a tube of less brittle and more easily machinable material extending therethrough substantially concentric with the axis of rotation.

5. A rotor for dynamo-electric machines having a two-pole permanent magnet with facilities for rotatively mounting it at its center, and a closed-circuited conductor surrounding said permanent magnet between its pole portions for minimizing demagnetizing flux changes therein.

6. A salient pole permanent magnet for the rotor of a dynamo-electric machine comprising a two-pole permanent magnet having a reduced center cross section in a central plane at right angles to its axis of rotation and having axial extensions at its central portion between the salient pole portions to give the magnet substantially the same cross-sectional area throughout its magnetic axis, and a closed-circuited conductor surrounding the central portion of said magnet between the pole pieces for minimizing demagnetizing flux changes therein.

7. A rotor for a two-pole self-starting synchronous motor having an outer cylindrical portion of magnetic material and a spider portion comprising a permanent bar magnet tightly fitted within the cylindrical portion on a diameter thereof, and a closed band of conducting material surrounding said permanent magnet to oppose demagnetizing flux changes therein.

FRANK W. MERRILL.